United States Patent
Kim et al.

(10) Patent No.: US 11,042,768 B1
(45) Date of Patent: Jun. 22, 2021

(54) DEEP LEARNING-BASED OBJECT RECOGNITION SYSTEM AND METHOD USING PIR SENSOR

(71) Applicant: Pusan National University Industry-University Cooperation Foundation, Busan (KR)

(72) Inventors: Jongdeok Kim, Busan (KR); Jaemin Lee, Changwon-si (KR); Donghyun Kim, Busan (KR)

(73) Assignee: Pusan National University Industry-University Cooperation Foundation, Busan (KR)

( * ) Notice: Subject to any disclaimer, the term of this patent is extended or adjusted under 35 U.S.C. 154(b) by 0 days.

(21) Appl. No.: 17/082,225

(22) Filed: Oct. 28, 2020

(30) Foreign Application Priority Data

Dec. 5, 2019 (KR) .................. 10-2019-0160873

(51) Int. Cl.
*G06K 9/20* (2006.01)
*G06K 9/00* (2006.01)
*G06K 9/62* (2006.01)
*G06K 9/40* (2006.01)

(52) U.S. Cl.
CPC ....... *G06K 9/2018* (2013.01); *G06K 9/00335* (2013.01); *G06K 9/00677* (2013.01); *G06K 9/00771* (2013.01); *G06K 9/40* (2013.01); *G06K 9/6232* (2013.01); *G06K 9/6256* (2013.01)

(58) Field of Classification Search
None
See application file for complete search history.

(56) References Cited

U.S. PATENT DOCUMENTS

| 2019/0258251 A1* | 8/2019 | Ditty | G05D 1/0274 |
| 2020/0007615 A1* | 1/2020 | Brebner | H04L 67/10 |
| 2020/0285953 A1* | 9/2020 | Samples | G06K 9/00711 |

OTHER PUBLICATIONS

Machine learning based object detection system using PIR sensor, by Kim et. al. ACCSE 2018: The third international conference on Advances in computation, communications and services; IBBN:978-1-61208-658-3 (Year: 2018).*

* cited by examiner

Primary Examiner — Vikkram Bali
(74) Attorney, Agent, or Firm — Paratus Law Group, PLLC

(57) ABSTRACT

Disclosed is a deep learning-based object recognition system which includes a data collection process executor configured to perform a data collection process of collecting values of the PIR sensor according to a sampling period; a data classification process executor configured to perform a data classification process of inputting the collected values of the PIR sensor to a model of an artificial neural network and transmitting a result of the inputting the collected values to a cloud using a RESTful API; and an object recognition cloud system configured to store information received from the data classification process executor in a database, transmit the information when a web application requests the information, and represent information collected and classified by devices using the RESTful API.

10 Claims, 8 Drawing Sheets

DEEP LEARNING-BASED OBJECT RECOGNITION SYSTEM AND METHOD USING PIR SENSOR

ACKNOWLEDGEMENT

This research was supported by the Korean Government, Ministry of Science and ICT (MSIT, Republic of Korea), under a Grand Information Technology Research Center support program (IITP-2020-2016-0-00318) supervised by an Institute for Information & Communications Technology Planning & Evaluation (IITP).

CROSS-REFERENCE TO RELATED APPLICATION

This application claims priority to Korean Patent Application No. 10-2019-0160873 (filed on Dec. 5, 2019), which is hereby incorporated by reference in its entirety.

BACKGROUND

The present invention relates to an object recognition system, and more particularly, to a deep learning-based object recognition system and method using a passive infra-red (PIR) sensor, in which a human and an object are identified using a new type of PIR sensor and a machine learning-based object detection algorithm.

A passive infra-red (PIR) sensor, which is one of various sensors capable of detecting objects, outputs time-series data according to a voltage change due to the pyroelectric effect, and a value thereof changes as a difference, which changes over time, in the amount of far-infrared rays emitted in the surroundings is passively accepted.

Various factors, which change the amount of emitted far-infrared rays, include a surface area of an object emitting far-infrared rays, heat of a surface of the object, and a moving speed of the object, etc., and the amounts of emitted far-infrared rays that are changed by the factors are different from each other.

In an object detection method of the related art, an object is detected using a threshold or a simple algorithm. Because a value of this method is affected by various factors, the reliability of a determination as to whether an object is present according to the method of the related art is not likely to be high and the method is of limited application.

Machine learning on which many related studies are being conducted can be utilized for various applications using a PIR sensor because it is possible to draw conclusions thereby in consideration of various variables.

However, when learning is performed to produce acceptable performance, it requires a high cost to collect a necessary amount of data and give a meaning to the data.

Meanwhile, in security systems, numerous light-sensing machines are being developed to prevent intrusion and generate an alarm using a PIR-based motion detection sensor.

However, the PIR-based motion detection sensor that operates according to a temperature difference between an object and a surrounding environment is very sensitive when the object moves closer thereto.

Therefore, the sensitivity of this sensor is low when the object is close enough to warm up the surrounding environment, and the sensor has more problems when an ambient temperature is closer to a human body temperature, e.g., during summer, than during winter.

In addition, the sensitivity of the sensor is likely to be low when the human body is moving slowly or a cover is present that blocks heat.

For example, when a user is holding an umbrella or wearing a raincoat, the umbrella or raincoat blocks heat from the user's body and thus it is difficult for the PIR sensor to detect a motion.

A reduction in the sensitivity of the sensor also occurs under sunlight.

An intrusion prevention system using a PIR sensor of the related art detects a motion on the basis of a threshold of the PIR sensor. When a digital logic value exceeds a fixed threshold, it is determined that an intrusion occurred and thus a logic HIGH value is generated, and otherwise, it is determined that no intrusion has occurred and thus a logic LOW value is generated.

The intrusion prevention system using the PIR sensor of the related art is capable of detecting only whether an object is present, and it is difficult to identify the detected object.

Accordingly, there is a need to develop technology for an object recognition system for identifying a human and an object using a new type of PIR sensor and a machine learning-based object detection algorithm.

SUMMARY

To address the problems of an object recognition system of the related art, the present invention is directed to providing a deep learning-based object recognition system and method using a passive infra-red (PIR) sensor, in which a human and an object are identified using a new type of PIR sensor and a machine learning-based object detection algorithm.

The present invention is directed to providing a deep learning-based object recognition system and method using a PIR sensor to increase object recognition performance by extracting various signals obtained by the PIR sensor and processing PIR data to extract a frequency component of a signal as a feature vector.

The present invention is directed to providing a deep learning-based object recognition system and method using a PIR sensor to improve object recognition performance through a learning method using an artificial convolutional neural network (CNN) and classification after learning.

The present invention is directed to providing a deep learning-based object recognition system and method using a PIR sensor to increase object recognition performance and usability by building a real-time-web-based monitoring system using an object-cloud.

The present invention is directed to providing a deep learning-based object recognition system and method using a PIR sensor to reduce a false-alarm rate using an object recognition technology of measured data using deep learning.

Aspects of the present invention are not limited thereto and other aspects not mentioned here will be clearly understood by those of ordinary skill in the art from the following description.

According to one aspect of the present invention, a deep learning-based object recognition system using a passive infra-red (PIR) sensor includes a data collection process executor configured to perform a data collection process of collecting values of the PIR sensor according to a sampling period; a data classification process executor configured to perform a data classification process of inputting the collected values of the PIR sensor to a model of an artificial neural network and transmitting a result of the inputting the collected values to a cloud using a RESTful API; and an object recognition cloud system configured to store information received from the data classification process executor in a database, transmit the information when a web application requests the information, and represent information collected and classified by a device using the RESTful API.

Here, the PIR sensor may provide an output on the basis of a voltage scale within a specific area to produce frequencies by performing a fast Fourier transform (FFT) on an analog signal sample and use the frequencies as convolutional neural network (CNN) feature vectors.

The object recognition cloud system may include a RESTful API framework configured to store information received from the data classification process executor in the database and transmit the information when the web application requests the information, and a monitoring web application configured to represent information collected and classified by the devices using the RESTful API.

The data collection process executor may input the collected values of the PIR sensor to the model of the artificial neural network, and the artificial neural network may be trained with signal patterns of motions of a human and an animal on the basis of a difference in waveform between infrared rays from a human and an animal to identify whether a recognized object is a human or an animal and to classify input data as one of three results, including no object, an animal, and a human, and indicate a distance to the object.

According to another aspect of the present invention, a deep learning-based object recognition method using a PIR sensor includes performing a data collection process of collecting values of the PIR sensor according to a sampling period; performing a data classification process of inputting collected values of the PIR sensor to a model of an artificial neural network and transmitting a result of the inputting the collected values to a cloud using a RESTful API; and identifying an object by storing information received from the data classification process in a database, transmitting the information when a web application requests the information, and representing information collected and classified by devices using the RESTful API.

Here, the performing of the data collection process may include inputting the collected values of the PIR sensor to the model of the artificial neural network and training the artificial neural network with signal patterns of motions of a human and an animal on the basis of a difference in waveform between infrared rays from a human and an animal to identify whether a recognized object is a human or an animal and to classify input data as one of three results, including no object, an animal, and a human, and indicate a distance to the object.

The performing of the data classification process may include limiting two or more duplicate values so as not to be produced to prevent overload on a microprocessor due to calculation by the artificial neural network, wherein a calculation time $t_n$ of the data classification process may be defined as $t_n = t_{after_n} - t_{prev_n}$, and a limitation of the number of classification processes according to time may be defined by $t_{after_n} < t_{prev_{n+1}}$.

When a range of $t_n$ is i±α ms, the data collection process may be performed at time intervals longer than i±α ms, which is a maximum value of $t_n$, to prevent redundant creation of the data collection process and may be created at time intervals of i±α ms.

The artificial neural network may include a data feature extracting neural network trained with waveforms of infrared rays from a human and an animal, which are receivable by the PIR sensor, to extract data features using a convolutional neural network (CNN) and cope with a change of data values due to noise and environmental changes; and a feature correlation identifying neural network configured to identify a correlation on the basis of several features extracted from one data sample using a recurrent neural network (RNN) and to derive a final result.

The final result may be classified as one of three results, including a human, an animal, and no object, and represents a distance to an object, wherein the distance of the final result may be continuous data obtained according to a linear regression, the human, the animal, and the no object may each represent a result corresponding to 0 or 1 according to a presence or absence of an object and are obtained according to a logistic regression, and an algorithm for object recognition may be configured as a combination of the linear regression and the logistic regression.

Cost functions according to the linear regression and the logistic regression may be different, and a final cost function is calculated by adding values of the cost functions of the linear regression and the logical regression, wherein cost functions according to the linear regression and the logistic regression are expressed by: $cost_{linear} = (y_{linear} - \hat{y}_{linear})^2$, $cost_{logistic} = -y_{logistic} \log(\hat{y}_{logistic}) - (1 - y_{logistic})\log(1 - \hat{y}_{logistic})$, and the final cost function is expressed as:

$$J(\theta) = \frac{1}{m} \sum_{i=1}^{m} [Cost_{linear} + Cost_{logistic}].$$

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which.

DETAILED DESCRIPTION

Hereinafter, exemplary embodiments of a deep learning-based object recognition system and method using a passive infra-red (PIR) sensor according to the present invention will be described in detail.

Features and advantages of the deep learning-based object recognition system and method using the PIR sensor according to the present invention will become apparent from a detailed description of embodiments to be described below.

Figure 1:
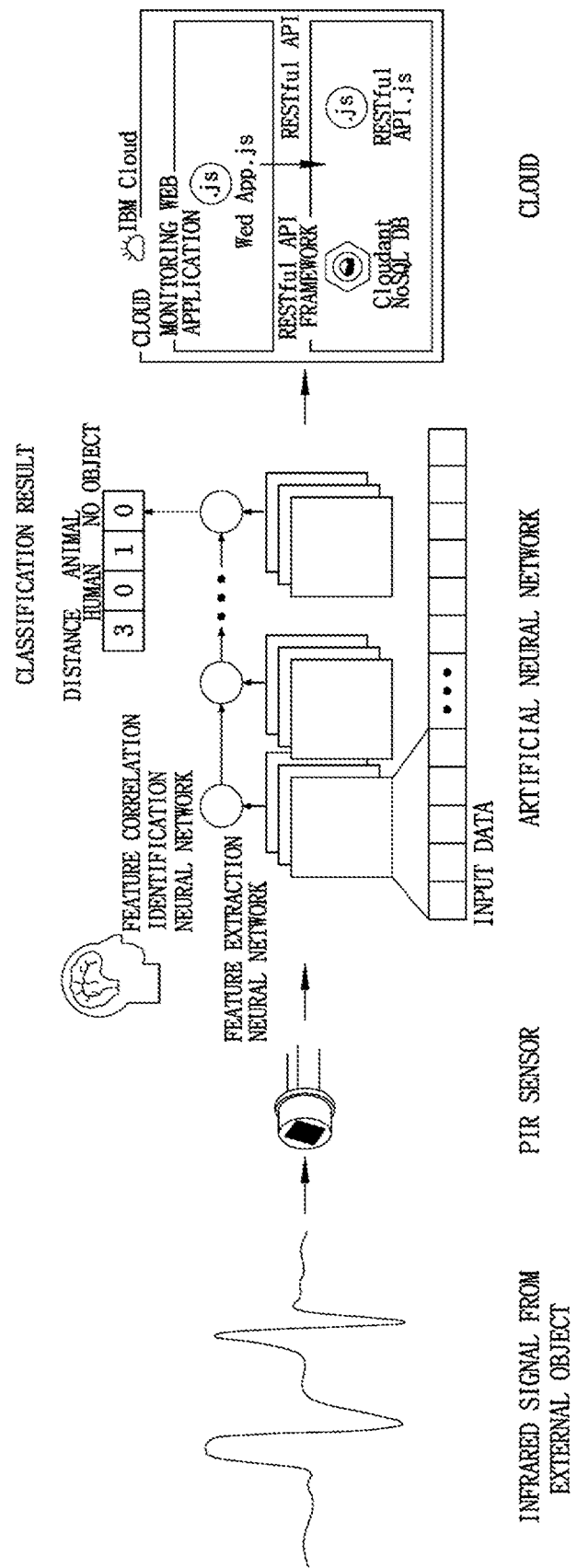
FIG. 1 is an overall configuration diagram of a deep learning-based object recognition system using a passive infra-red (PIR) sensor according to the present invention.
Figure 2A:
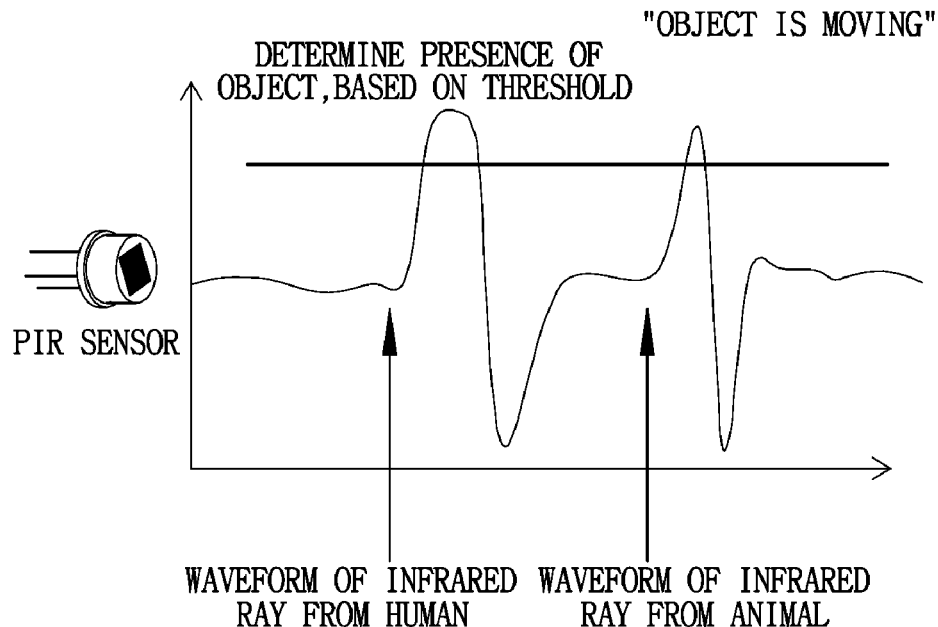
FIGS. 2A and 2B are configuration diagrams illustrating operating characteristics of a deep learning-based object recognition system using a PIR sensor according to the present invention.
Figure 2B:
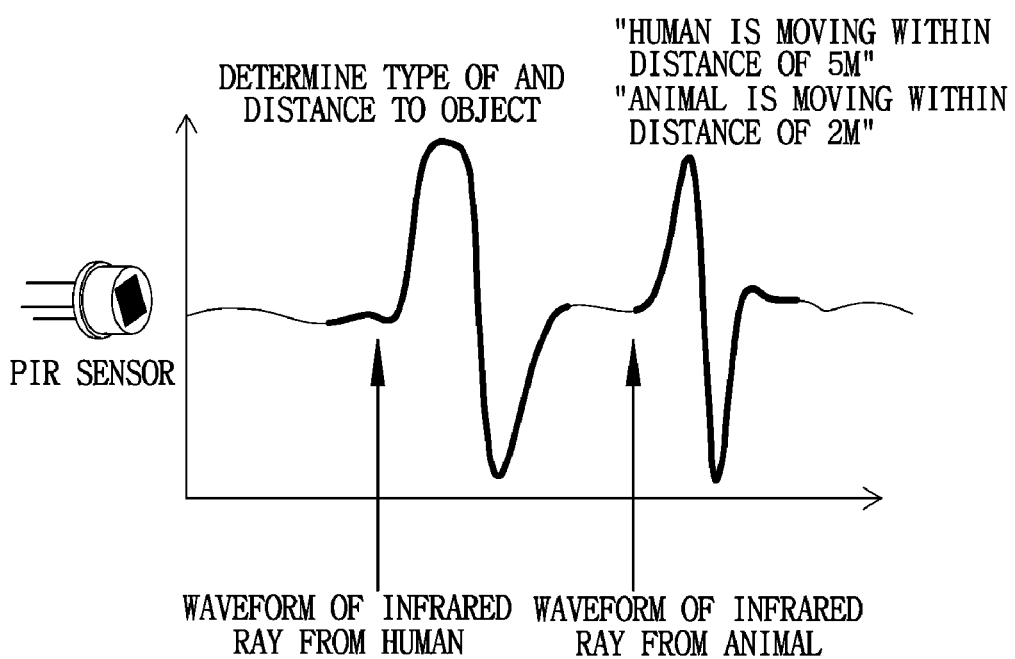

FIG. 1 is an overall configuration diagram of a deep learning-based object recognition system using a PIR sensor according to the present invention. FIGS. 2A and 2B are configuration diagrams illustrating operating characteristics of a deep learning-based object recognition system using a PIR sensor according to the present invention.

A deep learning-based object recognition system and method using a PIR sensor according to the present invention are capable of identifying a human and an object using a new type of PIR sensor and a machine learning-based object detection algorithm, in which a frequency component of a signal is extracted as a feature vector by extracting various signals obtained by the PIR sensor and processing PIR data, thereby improving object recognition performance.

In particular, object recognition performance may be improved by a learning method using an artificial convolutional neural network (CNN) and classification after learning, and the performance and use of object recognition may be improved by building a real-time web-based monitoring system using an object-cloud.

FIG. 1 is an overall configuration diagram of a deep learning-based object recognition system using a PIR sensor according to the present invention. The PIR sensor detects an infrared signal of an external object, and a deep learning-based object recognition cloud recognizes an object and provides a result of the recognition by a learning method using an artificial CNN and through classification after learning.

An intrusion prevention system using a digital PIR sensor is likely to erroneously sense an object rather than a human. To solve this error, according to the present invention, an analog PIR sensor and an object detection system using machine learning are built.

As illustrated in FIG. 2A, an intrusion prevention system using a PIR sensor of the related art senses a motion on the basis of a threshold of the PIR sensor. When a digital logic value exceeds a fixed threshold, it is determined that an intrusion occurred and thus a logic HIGH value is generated, and otherwise, it is determined that no intrusion has occurred and thus a logic LOW value is generated.

In contrast, as illustrated in FIG. 2B, an analog PIR sensor provides an output on the basis of various voltage scales within a specific area without generating a binary output using a threshold.

In the present invention, frequencies are generated by performing a Fast Fourier Transform (FFT) on an analog signal sample obtained using an analog PIR sensor and are used as feature vectors of a CNN.

In the present invention, signal patterns of motions of a human and an animal are learned using an artificial CNN to identify whether a recognized object is a human or an animal.

As illustrated in FIG. 2B, the type of an object and a distance to the object may be determined on the basis of the difference in waveform between infrared rays from a human and an animal.

A configuration of a deep learning-based object recognition system using a PIR sensor according to the present invention will be described in detail below.

Figure 3:
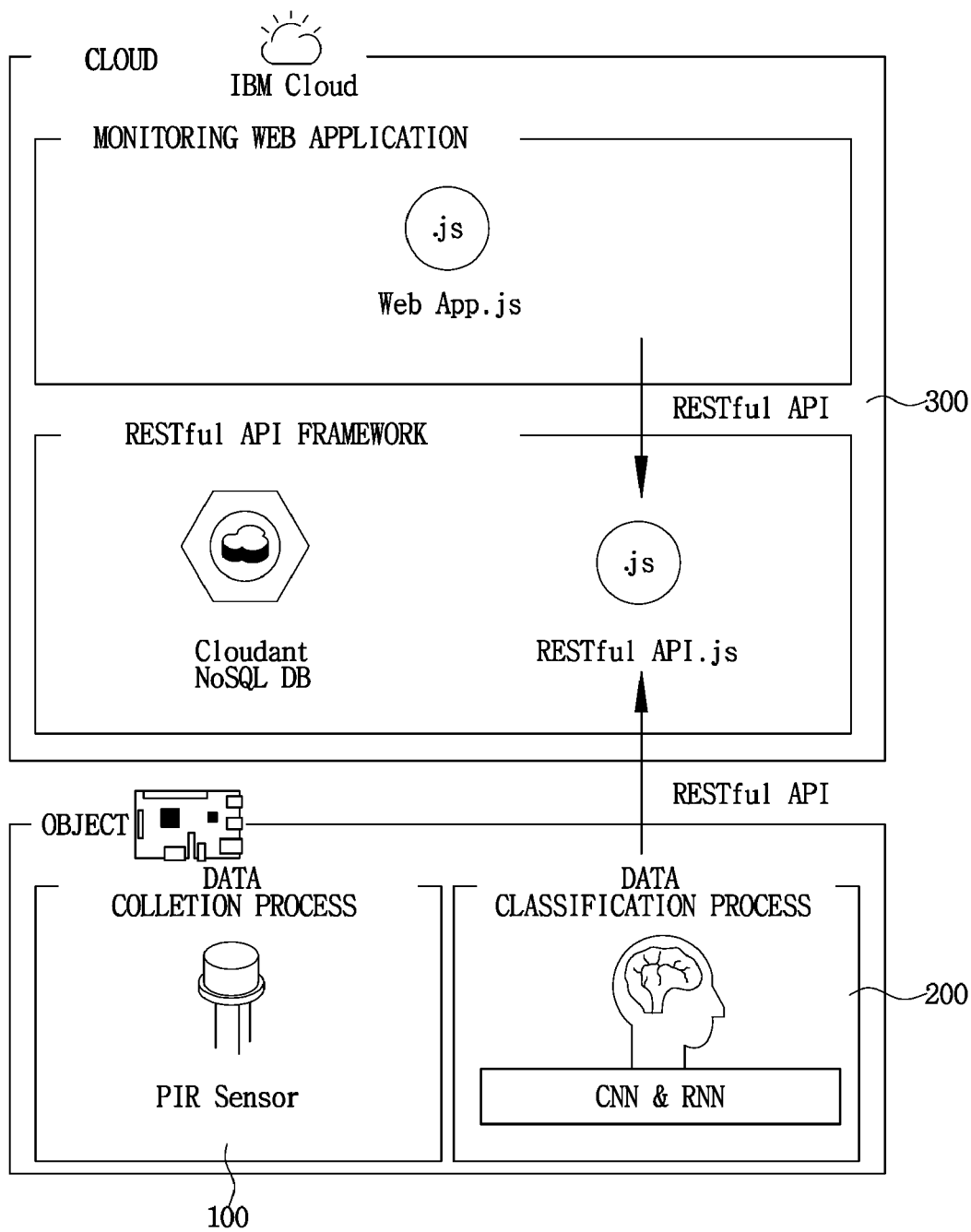
FIG. 3 is a detailed configuration diagram of a deep learning-based object recognition system using a PIR sensor according to the present invention.

FIG. 3 is a detailed configuration diagram of a deep learning-based object recognition system using a PIR sensor according to the present invention.

The deep learning-based object recognition system using a PIR sensor according to the present invention includes a data collection process executor 100 that performs a data collection process of collecting values of the PIR sensor according to a sampling period, a data classification process executor 200 that performs a data classification process of inputting collected values of the PIR sensor to a model of an artificial neural network and transmits a result of the inputting the values to a cloud using a RESTful API, and an object recognition cloud system 300 that stores information received from the data classification process executor 200 in a database, transmits the stored information when a web application requests the information, and represents information collected and classified by devices using the RESTful API.

Here, the object recognition cloud system 300 includes a RESTful AP framework for storing information received from the data classification process executor 200 in the database and transmitting the stored information when a web application requests the information, and a monitoring web application for representing information collected and classified by devices using the RESTful API.

Figure 4:
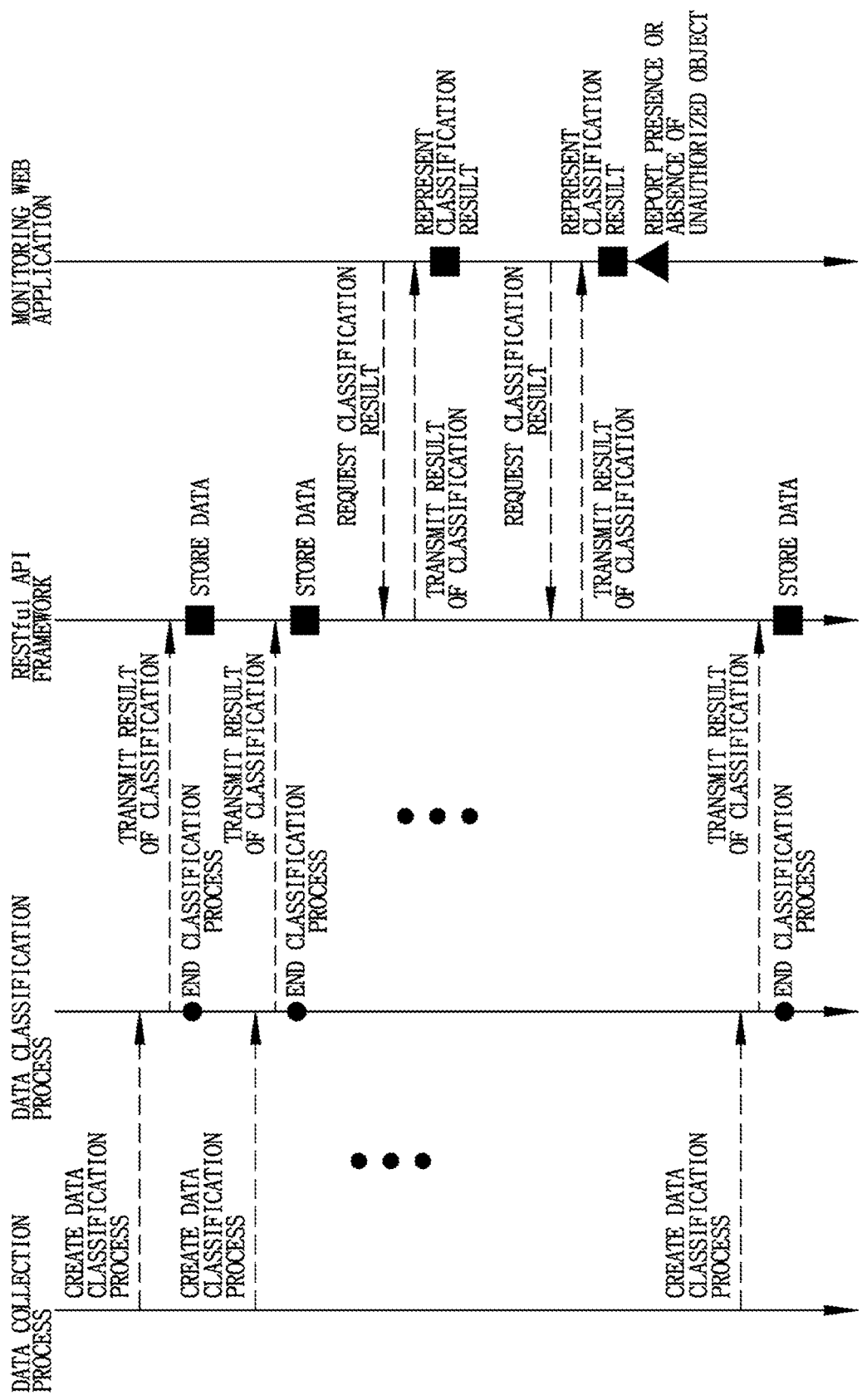
FIG. 4 is a flowchart of an event processing process of a deep learning-based object recognition system using a PIR sensor according to the present invention.

FIG. 4 is a flowchart of an event processing process of a deep learning-based object recognition system using a PIR sensor according to the present invention.

The data collection process executor 100 collects values of the PIR sensor according to a sampling period and inputs the collected values to a model of a trained artificial neural network.

The trained artificial neural network classifies the input data as one of three results: no object, an animal, and a human, and represents a distance to a corresponding object.

A result of the classification and representation is transmitted to the object recognition cloud system 300 through the RESTful API.

The object recognition cloud system 300 forms a RESTful API framework and a monitoring web application, and the RESTful API framework stores information received from the data classification process executor 200 in the database and transmits the information when a web application requests the information.

The monitoring web application represents information collected and classified by various devices through a RESTful API provided by the RESTful API framework.

A deep learning-based object recognition method using a PIR sensor according to the present invention will be described in detail below.

Figure 5:
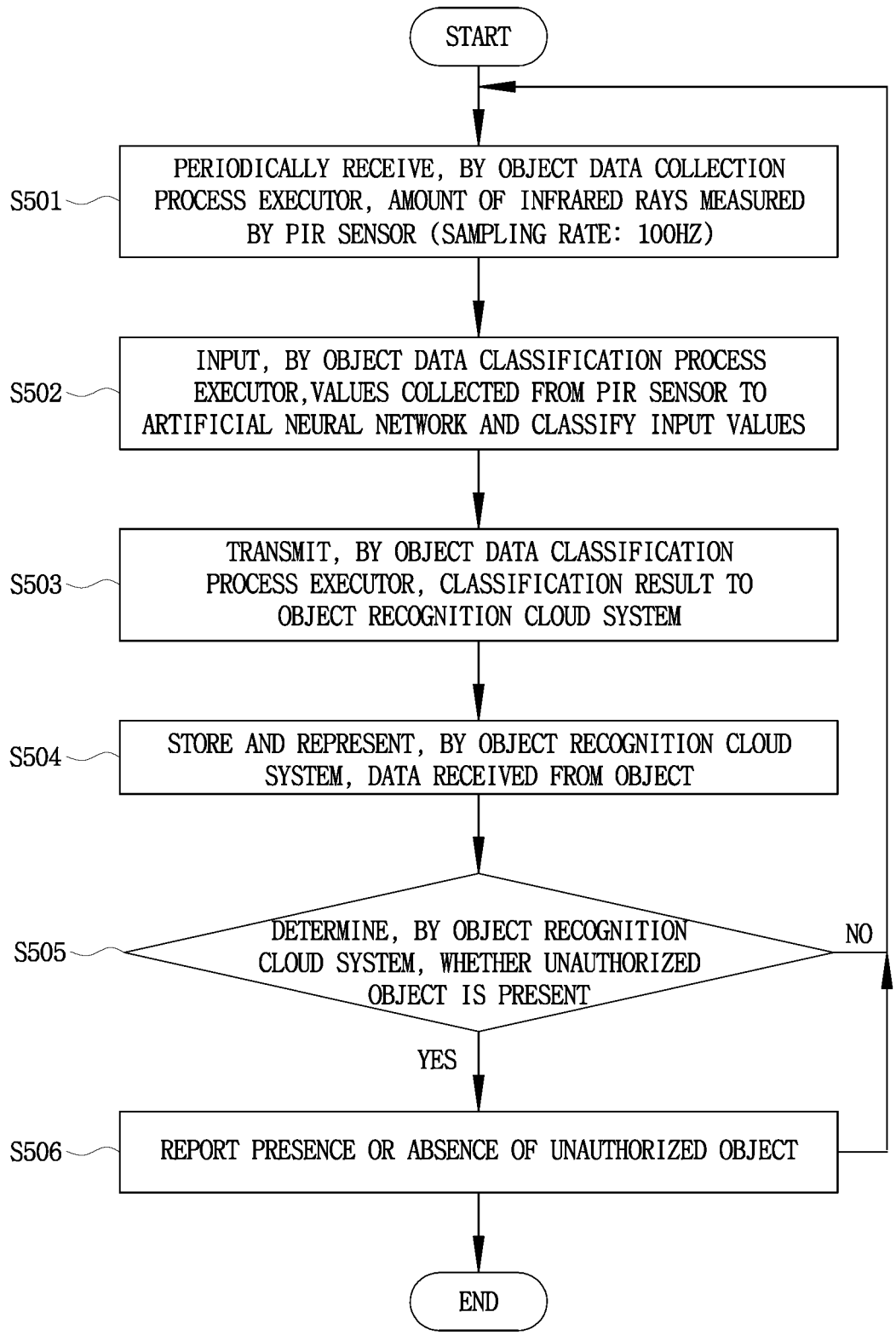
FIG. 5 is a flowchart of a deep learning-based object recognition method using a PIR sensor according to the present invention.

FIG. 5 is a flowchart of a deep learning-based object recognition method using a PIR sensor according to the present invention.

In the deep learning-based object recognition method using a PIR sensor according to the present invention, first, the object data collection process executor 100 periodically receives the amount of infrared rays measured by the PIR sensor (sampling rate: 100 Hz) (S501).

The object data collection process executor 100 collects values of the PIR sensor at a rate of 100 Hz. When the number of pieces of data collected reaches 300, a classification process is created.

When the classification process is created, some (e.g., fifteen pieces) of the collected data is removed and data is continuously collected. Similarly, when the number of pieces of data collected reaches 300, a classification process is created.

Next, the object data classification process executor 200 inputs collected values of the PIR sensor to an artificial neural network and classifies the input values (S502) and transmits a result of the classification to the object recognition cloud system 300 (S503).

The object recognition cloud system 300 stores and represents data received from an object (S504), determines whether an unauthorized object is present (S505), and reports the presence or absence of an unauthorized object (S506).

Figure 6:
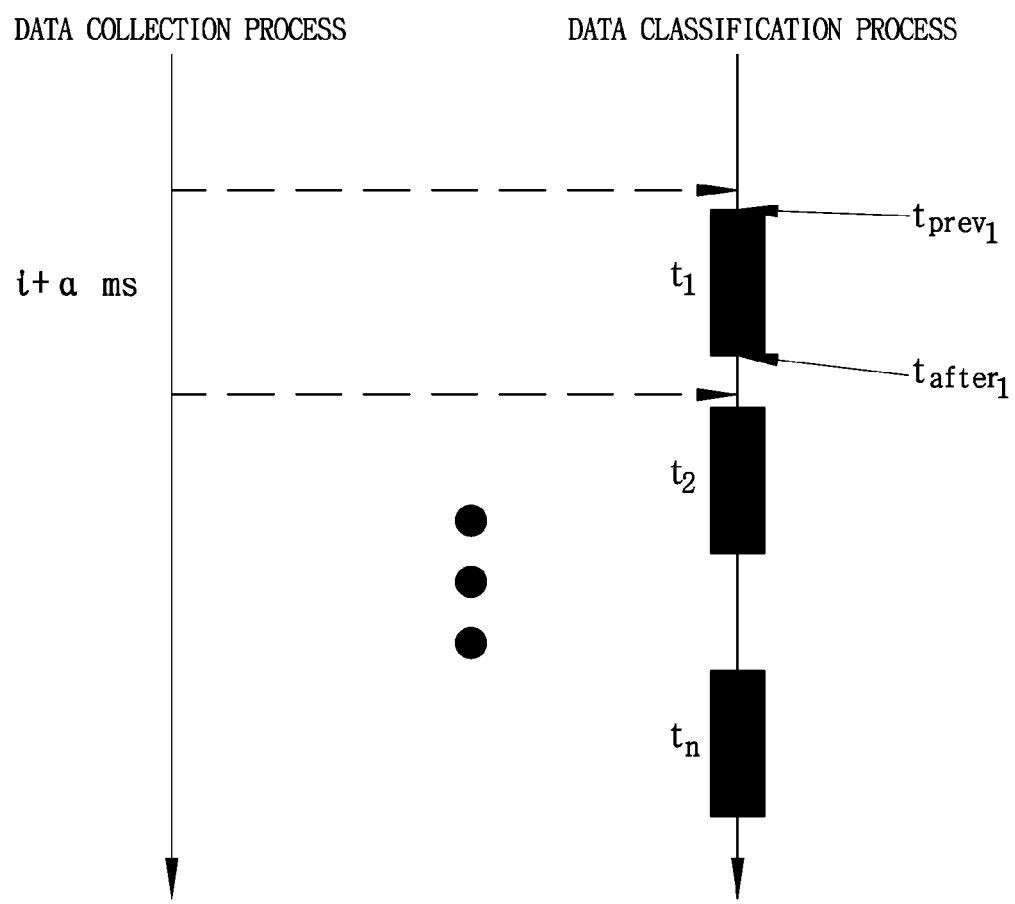
FIG. 6 is a diagram illustrating a real-time data processing process.

FIG. 6 is a diagram illustrating a real-time data processing process.

The data classification process executor 200 calculates an artificial neural network and thus may overload a microprocessor. Therefore, in the present invention, it is necessary to limit two or more duplicate values so as not to be generated.

A calculation time $t_n$ of a data classification process may be defined by:

$$t_n = t_{after_n} - t_{prev_n} \quad \text{[Equation 1]}$$

A limitation of the number of classification processes according to time may be defined by:

$$t_{after_n} < t_{prev_{n+1}} \quad \text{[Equation 2]}$$

If a range of $t_n$ is approximately i±α ms, the data collection process may be prevented from being duplicated when a period of the data collection process is longer than i±α ms, which is a maximum value of $t_n$.

Therefore, in the present invention, a data collection process is created at time intervals of i±α ms.

Figure 7A:
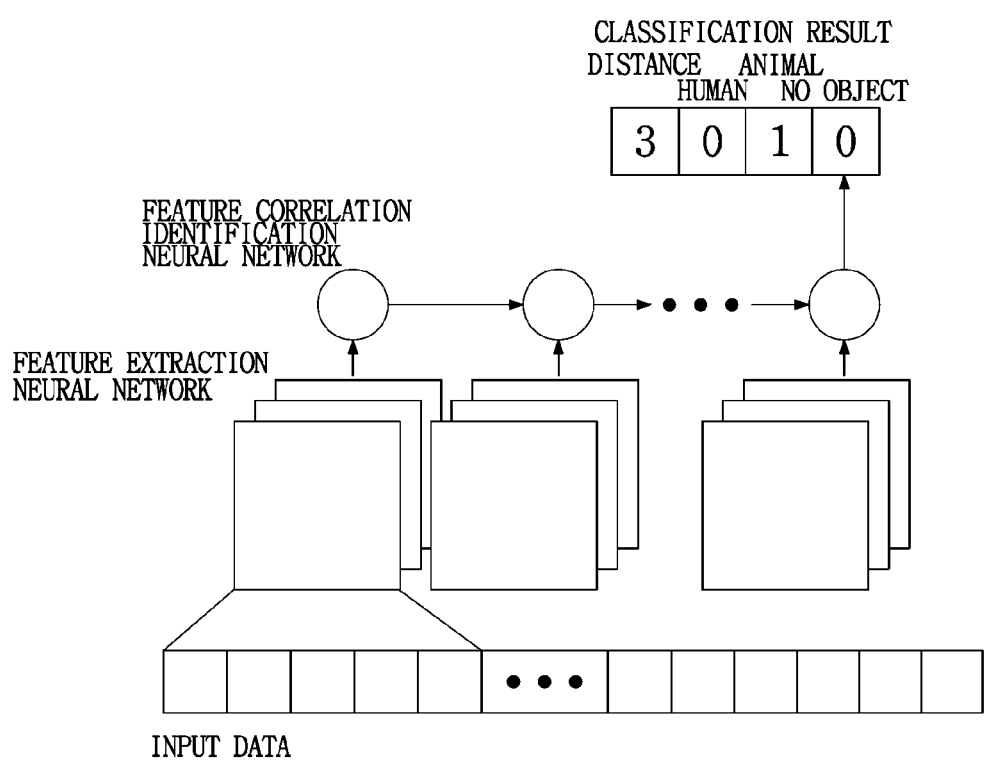
FIGS. 7A and 7B are diagrams for describing a deep learning-based object recognition algorithm using a PIR sensor according to the present invention.
Figure 7B:
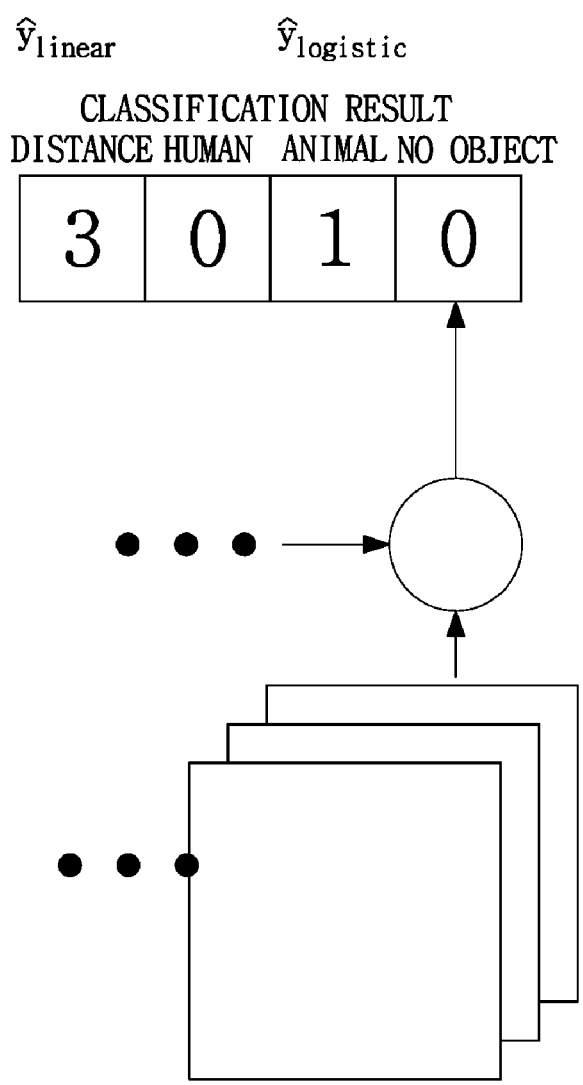

FIGS. 7A and 7B are diagrams for describing a deep learning-based object recognition algorithm using a PIR sensor according to the present invention.

The deep learning-based object recognition algorithm uses an artificial neural network. Input data refers to a total of 300 pieces of sample data.

The artificial neural network preferably includes a neural network for extracting data features using a CNN and a neural network for identifying a correlation between features using a recurrent neural network (RNN).

The neural network for extracting data features is trained with several waveforms of infrared rays from a human and an animal, which may be received by the PIR sensor. This neural network is capable of coping with a change of data values due to noise and environmental changes.

The neural network for identifying a correlation between features identifies a correlation on the basis of several features extracted from one data sample and derives a final result.

The final result represents a total of three pieces of classification data: a human, an animal and no object; and a distance m.

The distance m of the final result is continuous data and is obtained according to a linear regression. The rest (human, animal, and no object) of the final result should represent a result corresponding to 0 or 1 according to the presence or absence of an object and are obtained according to a logistic regression.

An object recognition algorithm according to the present invention is configured as a combination of the linear regression and the logistic regression.

Cost functions according to the linear regression and the logistic regression are different, and a final cost function is calculated by adding values of cost functions of the linear regression and the logical regression.

$$Cost_{linear} = (y_{linear} - \hat{y}_{linear})^2 \quad \text{[Equation 3]}$$

$$Cost_{logistic} = -y_{logistic}\log(\hat{y}_{logistic}) - (1 - y_{logistic})\log(1 - \hat{y}_{logistic})$$

$$J(\theta) = \frac{1}{m}\sum_{i=1}^{m}[Cost_{linear} + Cost_{logistic}] \quad \text{[Equation 4]}$$

In the deep learning-based object recognition system and method using a PIR sensor according to the present invention described above, whether a recognized object is a human or an animal is identified by learning signal patterns of motions of a human and an animal using an artificial neural network (CNN) so that the type of the object and a distance to the object may be identified on the basis of the difference in waveform between infrared rays from a human and an animal.

A deep learning-based object recognition system and method using a PIR sensor according to the present invention has the following advantages.

First, a human and an object can be identified using a new type of PIR sensor and machine learning-based object detection algorithm.

Second, object recognition performance can be improved by extracting various signals obtained by the PIR sensor and processing PIR data to extract a frequency component of a signal as a feature vector.

Third, object recognition performance can be improved through a learning method using an artificial convolutional neural network (CNN) and classification after learning, and object recognition performance and usability can be improved by building a real-time-web-based monitoring system using an object-cloud.

Fourth, a false-alarm rate can be reduced using an object recognition technology of measured data using deep learning.

It will be understood that the present invention may be implemented in modified forms without departing from the essential characteristics of the present invention as described above.

Therefore, the embodiments set forth herein should be considered in a descriptive sense only and not for purposes of limitation, the scope of the present invention is defined not by the above description but by the appended claims, and all differences within the scope of the present invention should be construed as being included in the present invention.

What is claimed is:

1. A deep learning-based object recognition system using a passive infra-red (PIR) sensor, the system comprising:
   a data collection process executor configured to perform a data collection process of collecting values of the PIR sensor according to a sampling period;
   a data classification process executor configured to perform a data classification process of inputting the collected values of the PIR sensor to a model of an artificial neural network and transmitting a result of the inputting the collected values to a cloud using a RESTful API; and
   an object recognition cloud system configured to store information received from the data classification process executor in a database, transmit the information when a web application requests the information, and represent information collected and classified by devices using the RESTful API,
   wherein the data process executor is further configured to limit two or more duplicate values so as not to be produced to prevent overload on a microprocessor due to calculation by the artificial neural network, a calculation time n of the data classification process is defined as $t_n = t_{after_n} - t_{prev_n}$, a limitation of a number of the data classification processes according to time is defined by $t_{after_n} < t_{prev_{n+1}}$, and the data collection process executor, the data classification process executor, and the object recognition cloud system are each implemented via at least one processor.

2. The system of claim 1, wherein the PIR sensor provides an output on the basis of a voltage scale within a specific area to produce frequencies by performing a fast Fourier transform (FFT) on an analog signal sample and use the frequencies as a convolutional neural network (CNN) feature vector.

3. The system of claim 1, wherein the object recognition cloud system comprises:
   a RESTful API framework configured to store information received from the data classification process executor in the database and transmit the information when the web application requests the information; and
   a monitoring web application configured to represent information collected and classified by the devices using the RESTful API.

4. The system of claim 1, wherein the data collection process executor inputs the collected values of the PIR sensor to the model of the artificial neural network, and
   the artificial neural network is trained with signal patterns of motions of a human and an animal on the basis of a difference in waveform between infrared rays from a human and an animal to identify whether a recognized object is a human or an animal and to classify input data as one of three results, including no object, an animal, and a human, and indicates a distance to the object.

5. A deep learning-based object recognition method using a passive infra-red (PIR) sensor, the method comprising:
   performing a data collection process of collecting values of the PIR sensor according to a sampling period;
   performing a data classification process of inputting collected values of the PIR sensor to a model of an artificial neural network and transmitting a result of the inputting the collected values to a cloud using a RESTful API; and
   recognizing an object by storing information received in the data classification process in a database, transmitting the information when a web application requests the information, and representing information collected and classified by devices using the RESTful API,
   wherein the performing of the data classification process comprises limiting two or more duplicate values so as not to be produced to prevent overload on a microprocessor due to calculation by the artificial neural network,
   a calculation time $t_n$ of the data classification process is defined as $t_n = t_{after_n} - t_{prev_n}$, and
   a limitation of a number of the data classification processes according to time is defined by $t_{after_n} < t_{prev_{n+1}}$.

6. The method of claim 5, wherein the performing of the data collection process comprises inputting the collected values of the PIR sensor to the model of the artificial neural network and training the artificial neural network with signal patterns of motions of a human and an animal on the basis of a difference in waveform between infrared rays from a human and an animal to identify whether the recognized object is a human or an animal and to classify input data as one of three results, including no object, an animal, and a human, and indicate a distance to the object.

7. The method of claim 5, wherein, when a range of $t_n$ is $i \pm \alpha$ ms, the data collection process is performed at time intervals longer than $i \pm \alpha$ ms, which is a maximum value of $t_n$, to prevent redundant creation of the data collection process and is created at time intervals of $i \pm \alpha$ ms.

8. The method of claim 5, wherein the artificial neural network comprises:
   a data feature extracting neural network trained with waveforms of infrared rays from a human and an animal, which are receivable by the PIR sensor, to extract data features using a convolutional neural network (CNN) and cope with a change of data values due to noise and environmental changes; and
   a feature correlation identifying neural network configured to identify a correlation on the basis of several features extracted from one data sample using a recurrent neural network (RNN) and to derive a final result.

9. The method of claim 5, wherein the final result is classified as one of three results, including a human, an animal, and no object, and represents a distance to the object,
   wherein the distance of the final result is continuous data and is obtained according to a linear regression,
   the human, the animal, and the no object each represent a result corresponding to 0 or 1 according to a presence or absence of an object and are obtained according to logistic regression, and
   an algorithm for object recognition is configured as a combination of the linear regression and the logistic regression.

10. The method of claim 9, wherein cost functions according to the linear regression and the logistic regression are different, and a final cost function is calculated by adding values of cost functions of the linear regression and the logical regression,
    wherein the cost functions of the linear regression and the logistic regression are expressed by:

$$\text{cost}_{linear} = (y_{linear} - \hat{y}_{linear})^2$$

$$\text{cost}_{logistic} = -y_{logistic} \log(\hat{y}_{logistic}) - (1 - y_{logistic}) \log(1 - \hat{y}_{logistic}),$$

and
the final cost function is calculated by:

$$J(\theta) = \frac{1}{m} \sum_{i=1}^{m} [Cost_{linear} + Cost_{logistic}].$$

* * * * *